United States Patent
Nie et al.

(10) Patent No.: US 9,846,503 B2
(45) Date of Patent: Dec. 19, 2017

(54) TOUCH DRIVER CIRCUIT, IN-CELL OPTICAL TOUCH PANEL COMPRISING THE TOUCH DRIVER AND DISPLAY DEVICE COMPRISING THE IN-CELL OPTICAL TOUCH PANEL

(71) Applicants: BOE TECHNOLOGY GROUP CO., LTD., Beijing (CN); CHENGDU BOE OPTOELECTRONICS TECHNOLOGY CO., LTD., Chengdu, Sichuan Province (CN)

(72) Inventors: Leisen Nie, Beijing (CN); Xiaojing Qi, Beijing (CN); Quanguo Zhou, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan Province (CN)

( * ) Notice: Subject to any disclaimer, the term of this patent is extended or adjusted under 35 U.S.C. 154(b) by 26 days.

(21) Appl. No.: 14/355,121

(22) PCT Filed: Dec. 14, 2013

(86) PCT No.: PCT/CN2013/089457
§ 371 (c)(1),
(2) Date: Apr. 29, 2014

(87) PCT Pub. No.: WO2014/206030
PCT Pub. Date: Dec. 31, 2014

(65) Prior Publication Data
US 2015/0205429 A1    Jul. 23, 2015

(30) Foreign Application Priority Data

Jun. 27, 2013  (CN) .......................... 2013 1 0263585

(51) Int. Cl.
*G06F 3/042* (2006.01)
*G06F 3/041* (2006.01)

(52) U.S. Cl.
CPC ............ *G06F 3/0416* (2013.01); *G06F 3/042* (2013.01); *G06F 3/0412* (2013.01); *G06F 3/0421* (2013.01)

(58) Field of Classification Search
None
See application file for complete search history.

(56) References Cited

U.S. PATENT DOCUMENTS 5,510,632 A * 4/1996 Brown ................ H01L 29/1066
                                                     257/256
2007/0085573 A1* 4/2007 Henzler ............... H03K 17/163
                                                     327/100

(Continued)

FOREIGN PATENT DOCUMENTS

CN          1937378 A       3/2007
CN        101359111 A       2/2009

(Continued)

OTHER PUBLICATIONS

JFETS, Feb. 2010, Semiconductor Components Industries, LLC, http://www.onsemi.com/pub_link/Collaterial/2N5457-D.PDF.*

(Continued)

*Primary Examiner* — Ilana Spar
*Assistant Examiner* — Kirk Hermann
(74) *Attorney, Agent, or Firm* — Ladas & Parry LLP (57) ABSTRACT

The touch driver circuit comprises a photosensor module, a data writing module, a driver module, and a control module. The data writing module transmits a scan signal at a scan signal terminal to the driver module under the control of the scan signal terminal. When the scan signal drives the driver module to turn on, the driver module outputs a touch sensing (Continued)

signal to the control module; the touch sensing signal decreases with the increase of an intensity of light irradiated on the photosensor module. Under the control of the control signal, the control module outputs the touch sensing signal output by the driver module to the touch signal sensing terminal, thereby realizing the touch sensing function.

12 Claims, 10 Drawing Sheets

(56) References Cited

U.S. PATENT DOCUMENTS

| | | |
|---|---|---|
| 2009/0033850 A1* | 2/2009 | Ishiguro .............. G02F 1/13338 349/116 |
| 2011/0128428 A1* | 6/2011 | Takatoku .............. G06F 3/0412 348/307 |
| 2013/0050135 A1 | 2/2013 | Chan et al. |
| 2013/0050138 A1* | 2/2013 | Chan ..................... G06F 3/044 345/174 |
| 2013/0063398 A1* | 3/2013 | Ko et al. ....................... 345/175 |

FOREIGN PATENT DOCUMENTS

| | | |
|---|---|---|
| CN | 102955604 A | 3/2013 |
| CN | 102999227 A | 3/2013 |
| CN | 103135846 A | 6/2013 |
| CN | 103353814 A | 10/2013 |
| KR | 20130000220 A | 1/2013 |

OTHER PUBLICATIONS

International Search Report dated Mar. 20, 2014; PCT/CN2013/089457.
Written Opinion of the International Searching Authority dated Mar. 12, 2014; PCT/CN2013/089457.
First Chinese Office Action dated Oct. 28. 2015; Appln. No. 201310263585.1.
Second Chinese Office Action dated Mar. 3, 2016; Appln. No. 201310263585.1.
Third Chinese Office Action dated Jun. 20, 2016; Appln. No. 201310263585.1.

* cited by examiner

TOUCH DRIVER CIRCUIT, IN-CELL OPTICAL TOUCH PANEL COMPRISING THE TOUCH DRIVER AND DISPLAY DEVICE COMPRISING THE IN-CELL OPTICAL TOUCH PANEL

TECHNICAL FIELD

The invention relates to the field of touch screen technology, and more particularly, to a touch driver circuit, an in-cell optical touch panel, and a display device.

BACKGROUND

With the rapid development of display technologies, touch screen panels are widely applied in people's daily life. Currently, in-cell touch panels are very popular with the major panel manufactures as the touch components are embedded inside the display panels, which can not only reduce the overall thickness of modules but also significantly reduce the fabrication costs of touch panels. Therefore, driving methods for the in-cell touch panels are a research topic of much concern in the touch panel area.

A driver circuit in a conventional in-cell optical touch panel is a multi-stage driver circuit comprises driver circuits for respective stages for implementing the touch function; the signal at a touch signal sensor of the driver circuit at each stage is read via a touch signal sensing line, and the position of a touch point is determined by analyzing the signal at the touch signal sensor.

The main drawback of the driver circuit for the conventional in-cell optical touch panel lies in that: signals output at touch signal sensors for different driver stages will interfere with each other if the touch signal sensors of the driver circuits for the stages are connected to the same touch signal sensing line, thereby jeopardizing the accuracy of touch signal detection of the touch panel; on the other hand, the wiring area in the touch panel will be increased if an individual touch signal sensing line is configured for each touch signal sensor of individual driver stages.

SUMMARY

Embodiments of the invention provide a touch driver circuit, an in-cell touch panel and a display device with an aim of improving the accuracy of the touch signal detection without increasing the touch wiring area.

An embodiment of the invention provides a touch driver circuit, comprising a photosensor module, a data writing module, a driver module and, a control module.

A first terminal of the photosensor module is connected to a first reference signal terminal, and a second terminal of the photosensor module is connected to a signal output terminal of the data writing module and a first signal input terminal of the driver module, respectively.

A first signal input terminal of the data writing module is connected to a scan signal terminal, a second signal input terminal of the data writing module is respectively connected to a second reference signal terminal and a second signal input terminal of the driver module, and the data writing module is configured to transmit a scan signal of the scan signal terminal to the driver module under the control of the scan signal terminal.

A signal output terminal of the driver module is connected to a first signal input terminal of the control module; the driver module is configured to output a touch sensing signal to the control module where the driver module is turned-ON under the control of the scan signal, and the touch sensing signal decreases with increase of an intensity of light irradiated on the photosensor module.

A second signal input terminal of the control module is connected to a control signal terminal, and a signal output terminal of the control module is connected to a touch signal sensing terminal; the control module is configured to output the touch sensing signal output by the driver module to the touch signal sensing terminal under control of the control signal terminal.

An embodiment of the invention provides an in-cell optical touch panel comprising the touch driver circuit provided by the embodiment of the invention.

An embodiment of the invention provides a display device comprising the in-cell optical touch panel provided by the embodiment of the invention.

The advantageous effects of the embodiments of the inventions are as follows.

The embodiments of the invention provide a touch driver circuit, an in-cell optical touch panel and a display device. The touch driver circuit comprises a photosensor module, a data writing module, a driver module, and a control module. The data writing module transmits a scan signal at a scan signal terminal to the driver module under the control of the scan signal terminal. When the scan signal drives the driver module to turn on, the driver module outputs a touch sensing signal to the control module; the touch sensing signal decreases with the increase of an intensity of light irradiated on the photosensor module. Under the control of the control signal, the control module outputs the touch sensing signal output by the driver module to the touch signal sensing terminal, thereby realizing the touch sensing function. In the touch driver circuit provided by the embodiment of the invention, the driver module transmits the touch sensing signal to the touch signal sensing terminal under the control of the control module. In the case where touch signal sensing terminals of driver circuits of different stages are connected to the same touch signal sensing line, the cross-talk between the signals output at the touch signal sensing terminal of driver circuits of different stages can be avoided, which improves the accuracy of the touch signal detection without increasing the touch wiring area of the touch panel.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Detailed implementations of a touch driver circuit, an in-cell touch panel and a display device as provided by embodiments of the invention will be described in the following with reference to the drawings.

Figure 1A:
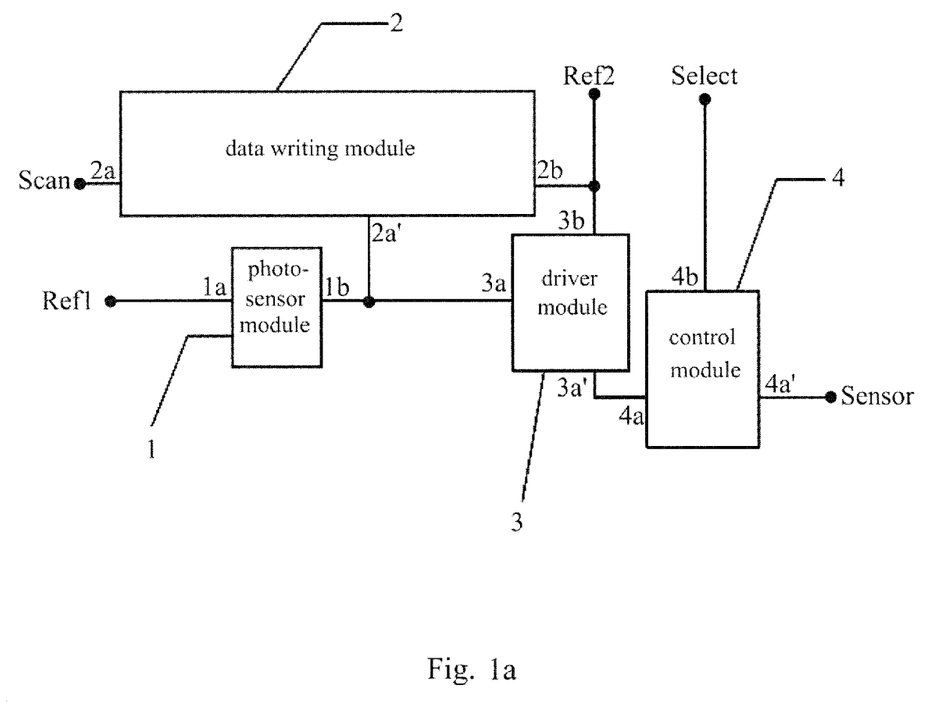
FIGS. 1a and 1b schematically illustrate a touch driver circuit in accordance with an embodiment of the invention.

An embodiment of the invention provides a touch driver circuit as illustrated in FIG. 1a, which comprises a photosensor module 1, a data writing module 2, a driver module 3, and a control module 4; a first terminal 1a of the photosensor module 1 is connected to a first reference signal terminal (Ref1), and a second terminal 1b of the photosensor module 1 is connected to both a signal output terminal 2a' of the data writing module 2 and a first signal input terminal 3a of the driver module 3; a first signal input terminal 2a of the data writing module 2 is connected to a scan signal terminal (Scan), a second signal input terminal 2b of the data writing module 2 is respectively connected to a second reference signal terminal (Ref2) and a second signal input terminal 3b of the driver module 3; the data writing module 2 transmits a scan signal from the scan signal terminal Scan to the driver module 3 under the control of the scan signal terminal Scan; a signal output terminal 3a' of the driver module 3 is connected to a first signal input terminal 4a of the control module 4; when the driver module 3 is turned-ON under the control of the scan signal, the driver module 3 outputs a touch sensing signal to the control module 4, and the touch sensing signal decreases with the increase of the intensity of the light irradiated on the photosensor module 1; a second signal input terminal 4b of the control module 4 is connected to a control signal terminal (Select), and a signal output terminal 4a' of the control module 4 is connected to a touch signal sensing terminal (sensor); the control module 4 outputs the touch sensing signal output by the driver module 3 to the touch signal sensing terminal sensor under the control of the control signal terminal Select.

In the above touch driver circuit provided by the embodiment of the invention, the driver module transmits the touch sensing signal to the touch signal sensing terminal sensor under the control of the control module, and in the case that touch signal sensing terminals of individual driver stages are connected to a same touch signal sensing line, the cross-talk between the signals output at the touch signal sensing terminals of different driver stages can be avoided, which improves the accuracy of the touch signal detection without increasing the wiring area of the touch panel.

As illustrated in FIGS. 2a to 2d, in implementing, the data writing module 2 in the above-described touch driver circuit provided by an embodiment of the invention may comprise a first switch transistor T1 and a capacitor Cst; a first terminal x of the capacitor Cst is connected to the second reference signal terminal Ref2, a second terminal y of the capacitor Cst is connected to the drain electrode of the first switch transistor T1; the source electrode and the gate electrode of the first switch transistor T1 are respectively connected to the scan signal terminal Scan.

Figure 2A:
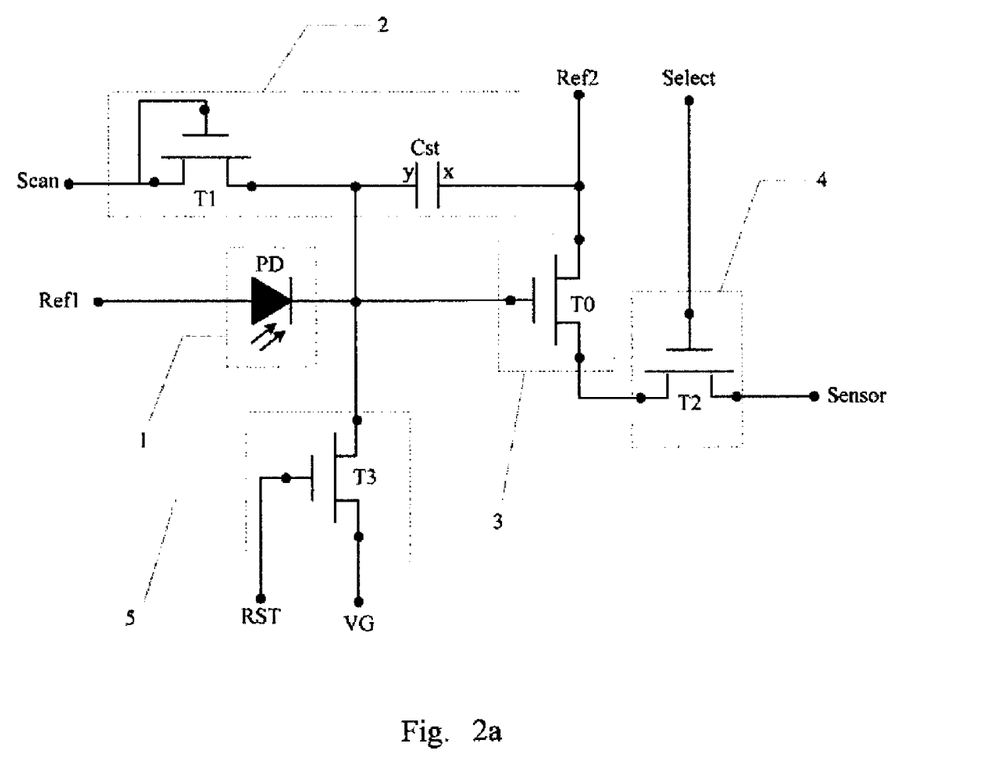
FIGS. 2a to 2d schematically illustrate a touch driver circuit in accordance with an embodiment of the invention.
Figure 2B:
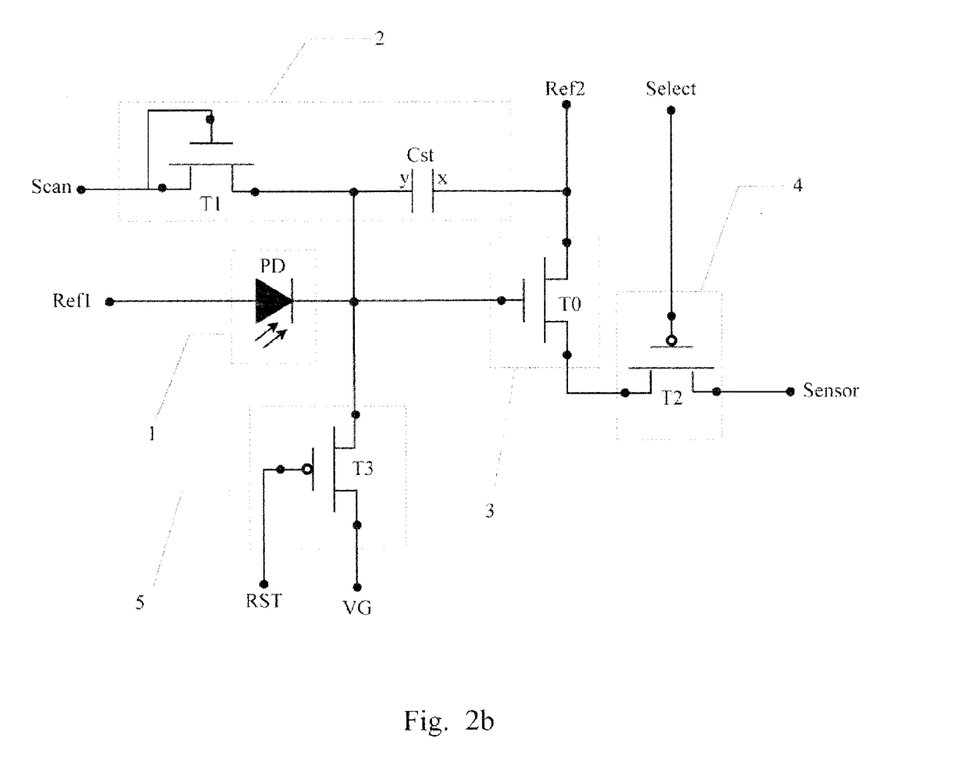
Figure 2C:
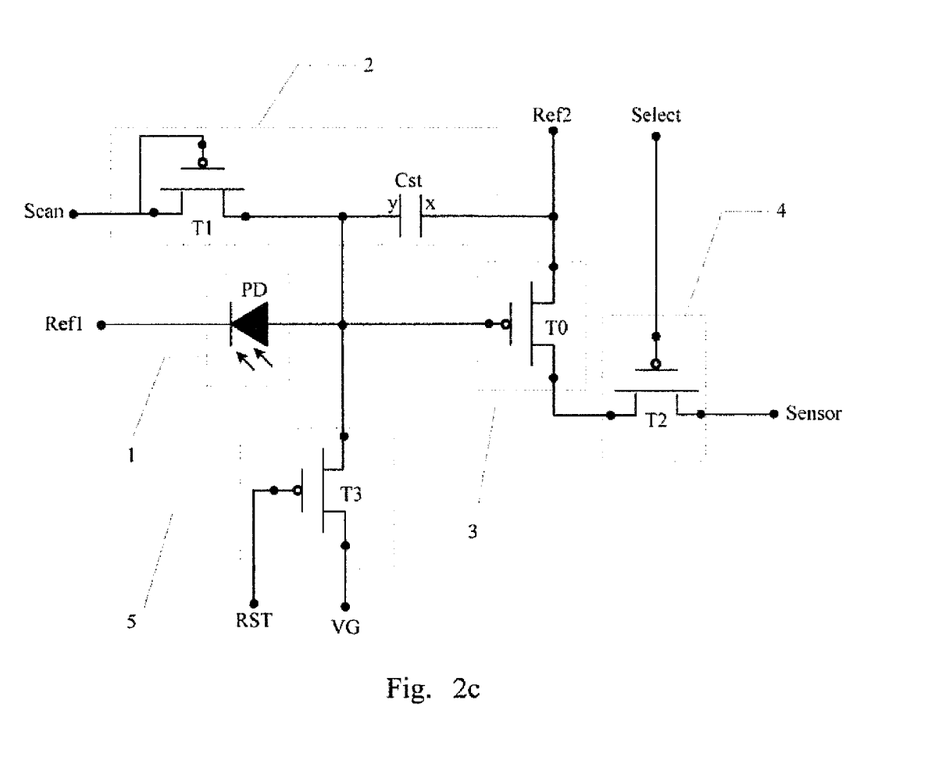
Figure 2D:
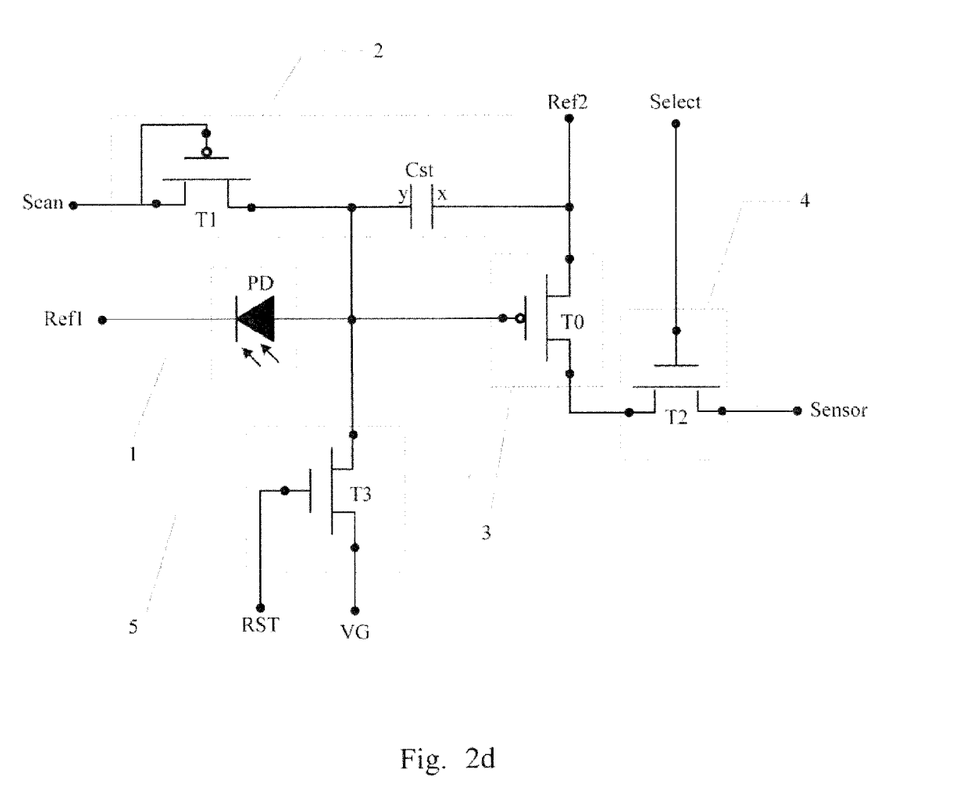

Please note that, in implementing, the first switch transistor T1 may be an N-type transistor as illustrated in FIGS. 2a and 2b. Alternatively, the first switch transistor T1 may also be a P-type transistor as illustrated in FIGS. 2c and 2d, which will not be limited here.

Furthermore, in implementing, when the first switch transistor T1 is an N-type transistor, the first switch transistor T1 is turned on only if the signal scan terminal Scan has a high level signal; when the first switch transistor T1 is a P-type transistor, the first switch transistor T1 will be turned on only if the signal scan terminal Scan has a low level signal.

For example, when the above touch driver circuit provided by the embodiment of the invention is implemented, signals on the first reference signal terminal Ref1 and the second reference signal terminal Ref2 are both constant voltage signals, and the voltage of the signal at the first reference signal terminal Ref1 is generally smaller than that of the signal at the second reference signal terminal Ref2.

For example, when the write module 2 is turned on, the scan signal output by the scan signal terminal Scan is output to the second terminal y of the capacitor Cst via the turned-on first switch transistor T1, and the signal at the second reference signal terminal Ref2 is input to the first terminal x of the capacitor Cst x, charging the capacitor Cst. Moreover, the second terminal y of the capacitor Cst is connected to the first signal input terminal of the driver module 2, thus the scan signal is written to the driver module 2 while the capacitor Cst is charged.

In implementing the above-described touch driver circuit provided by the embodiment of the invention, as illustrated in FIGS. 2a to 2d, the driver module 3 may comprises a driving transistor T0; the gate electrode of the driving transistor T0 is connected to the drain electrode of the first switch transistor T1, the source electrode of the driving transistor T0 is connected to the second reference signal terminal Ref2, and the drain electrode of the driving transistor T0 is connected to the first signal input terminal of the control module 4.

For example, the driving transistor T0 may be an N-type transistor as illustrated in FIGS. 2a and 2b. Alternatively, the driving transistor T0 may be a P-type transistor as illustrated in FIGS. 2c and 2d, which will not be limited here. When the driving transistor T0 is an N-type transistor, the driving transistor T0 will be turned on only when the gate voltage of the driving transistor T0 is of a high level, that is, when the scan signal input to the driver module is of a high level. When the driving transistor T0 is a P-type transistor, the driving transistor T0 will be turned on only when the gate voltage of the driving transistor T0 is of a low level, that is, when the scan signal input to the driver module is of a low level.

Furthermore, in implementing the touch driver circuit as provided by the embodiment of the invention, the first switch transistor T1 and the driving transistor T0 are both N-type transistors as illustrated in FIGS. 2a and 2b. Alternatively, the first switch transistor T1 and the driving transistor T0 are both P-type transistors as illustrated in FIGS. 2c and 2d, which will not be limited here.

For example, when both the first switch transistor T1 and the driving transistor T0 are N-type transistors, the first switch transistor T1 is in a turned-on state when the scan signal at the scan signal terminal Scan is of a high level. The turned-on first switch transistor T1 inputs the high level scan signal to the gate electrode of the driving transistor T0, turning on the driving transistor T0. When both the driving transistor T0 and the first switch transistor T1 are P-type transistors, the first switch transistor T1 is in turned-on state when the scan signal at the scan signal terminal Scan is of a low level. The turned-on first switch transistor T1 inputs the low level scan signal to the gate electrode of the driving transistor T0, turning on the driving transistor T0. The turned-on driving transistor T0 outputs a touch sensing signal to the control module 4, and the touch sensing signal decreases with the increase of the intensity of light irradiated on the photosensor module 1.

In implementing the above touch driver circuit provided by the embodiment of the invention, the photosensor module 1 as illustrated in FIGS. 2a to 2d may comprise a photodiode (PD).

To ensure that the PD is in a backward-biased state, when the driving transistor T0 and the first switch transistor T1 are both N-type transistors as illustrated in FIGS. 2a and 2b, the negative electrode of the PD is connected to the gate electrode of the driving transistor T0. In contrast, when the driving transistor T0 and the first switch transistor T1 are both P-type transistors as illustrated in FIGS. 2c and 2d, the positive electrode of the PD is connected to the gate electrode of the driving transistor T0.

Please note that a PD is turned on only when being backward-biased and at the same time irradiated. The operation principle of a PD is as follows: when light is irradiated on the PD that is backward-biased, that is, when the PD is not touched, the PD generates carriers under the photoelectric effect and a large backward current is formed. The stronger the light irradiating the PD is, the larger the current generated by the PD is.

For example, when both the first switch transistor T1 and the driving transistor T0 are N-type transistors, the first switch transistor T1 and the driving transistor T0 are turned on when the scan signal at the scan signal terminal Scan is of a high level. The turned-on driving transistor T0 outputs the touch sensing signal to the control module 4. At this point, if light is irradiated on the PD, the backward current generated by PD under the photoelectric effect drives the gate voltage of the transistor T0 to lower, decreasing the touch sensing signal output by the driving transistor T0. When both the driving transistor T0 and the first switch transistor T1 are P-type transistors, the first switch transistor T1 and the driving transistor T0 are turned on when the scan signal at the scan signal terminal Scan is of a low level. The turned-on driving transistor T0 outputs the touch sensing signal to the control module 4. At this point, if light is irradiated on the PD, the backward current generated by PD under the photoelectric effect drives the gate voltage of the transistor T0 to rise, decreasing the touch sensing signal output by the driving transistor T0.

In implementing the touch driver circuit provided by the embodiment of the invention, the control module 4 as illustrated in FIGS. 2a to 2d may comprise a second switch transistor T2.

The gate electrode of the second switch transistor T2 is connected to the control signal terminal Select, the source electrode of the second switch transistor T2 is connected to the signal output terminal of the driver module 3, and the drain of the second switch transistor T2 is connected to the touch signal sensing terminal sensor.

For example, the second switch transistor T2 may also be an N-type transistor as illustrated in FIGS. 2a and 2b. Alternatively, the second switch transistor T2 may also be a P-type transistor as illustrated in FIGS. 2c and 2d, which will not be limited here. When the second switch transistor T2 is an N-type transistor, the second switch transistor T2 will be turned on only when the signal at the control signal terminal Select is of a high level. When the second switch transistor T2 is a P-type transistor, the second switch transistor T2 will be turned on only when the signal at the control signal terminal Select is of a low level. The turned-on second switch transistor T2 will transmit the touch sensing signal output by the driver module 3 to the touch signal sensing terminal sensor.

Furthermore, in the touch driver circuit provided by the embodiment of the invention, the control module 4 is configured for controlling the driver module 3 to output the touch sensing signal to the touch signal sensing terminal sensor. That is, the touch sensing signal output by the driver module 3 will be transmitted to the touch signal sensing terminal sensor only when the second switch transistor T2 is turned on. When the switch transistor T2 is turned off, no signal is output at the touch signal sensing terminal. In this way, in a multi-stage driver circuit comprising a plurality of the above-described touch driver circuits, when the touch signal sensing terminals of the driver circuits of different stages are connected to the same touch signal sensing line, and when the control module of the driver circuit of one stage is switched on, the control modules of the driver circuits of all the other stages will be switched off, and only the touch signal sensing terminal of the one driver stage outputs a signal, which is not interfered by the signals output by the driver circuits of other stages. As a result, the cross-talk between the signals output by the touch signal sensing terminal of the driver circuits of different stages, thereby improving the accuracy of touch signal detection without increasing the wiring area of the touch panel.

Figure 1B:
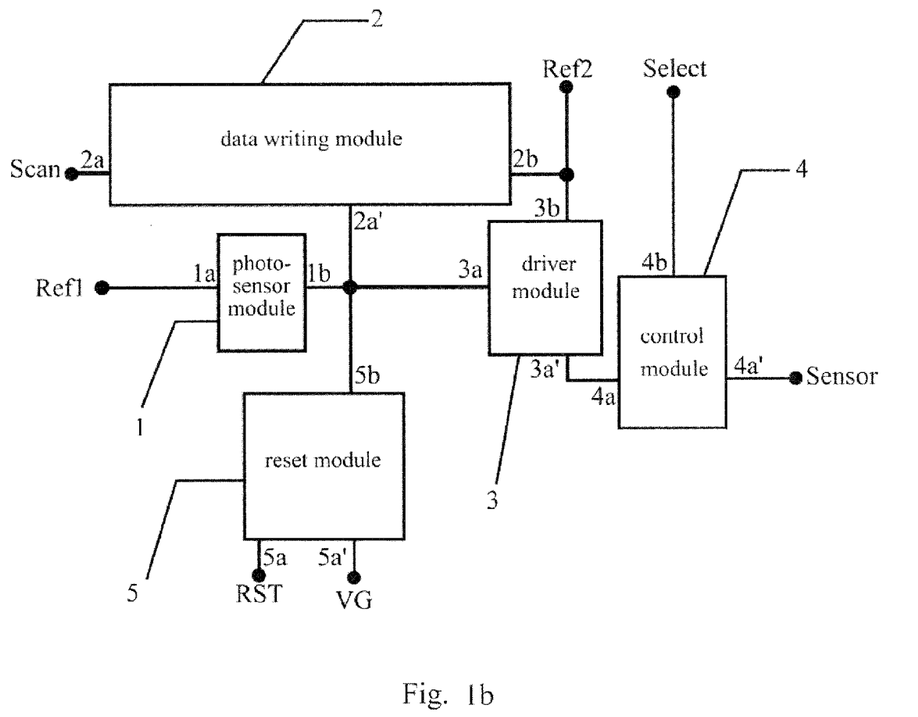

Furthermore, as illustrated in FIG. 1b, the touch driver circuit provided by the embodiment of the invention may further comprise a reset module 5; a first signal input terminal 5a of the reset module 5 is connected to a reset control signal terminal RST, a second signal input terminal 5b of the reset module is connected to the first signal input terminal 3a of the driver module 3, and a signal output terminal 5a' of the reset module 5 is connected to a reset signal terminal VG; the driver module 3 is turned-off under the control of the reset module 5, under the control of the reset controls signal terminal RST. In the above-described touch driver circuit, the gate voltage of the driver module 3 may be returned to an initial state in the case where the reset module 5 to turn the driver module 3 off.

For example, in implementing the above-described touch driver circuit provided by the embodiment of the invention, the reset module 5 as illustrated in FIGS. 2a to 2d may comprise a third switch transistor T3; the gate electrode of the third switch transistor T3 is connected to the reset control signal terminal RST, the source electrode of the third switch transistor T3 is connected to the first signal input terminal of the driver module 3, and the drain electrode of the third switch transistor T3 is connected to the reset signal terminal VG.

For example, the third switch transistor T3 may be an N-type transistor as illustrated in FIGS. 2a and 2b. Alternatively, the third switch transistor T3 may also be a P-type transistor as illustrated in FIGS. 2c and 2d, which will not be limited here. When the third switch transistor T3 is an N-type transistor, the third switch transistor T3 will be turned on only when the signal at the reset control signal terminal RST is of a high level. When the third switch transistor T3 is a P-type transistor, the third switch transistor T3 will be turned on only when the signal at the reset control signal terminal RST is of a low level. The turn-on third transistor T3 will drive the gate voltage of the driver module 3 to return to the initial state.

Please note that the signal at the reset signal terminal VG should be of a low level when the driving transistor T0 is an N-type transistor. In this way, when the third switch transistor T3 is turned on, the high level scan signal at the scan signal terminal Scan is directly input to the reset signal terminal VG connected to the drain electrode of the third transistor T3, driving the gate voltage of the driver transistor T0 to lower, thereby turning off the driver transistor T0 and resuming the gate voltage of the driver transistor T0 to the initial state. The signal at the reset signal terminal VG should be of a high level when the driving transistor T0 is a P-type transistor. In this way, when the third switch transistor T3 is turned on, the reset signal terminal VG connected to the drain electrode of the third transistor T3 drives the gate voltage of the driver transistor T0 to rise, thereby turning off the driver transistor T0 and resuming the gate voltage of the driver transistor T0 to the initial state.

Please note that the driving and switch transistors provided in the touch driver circuit provided by the embodiment of the invention may be thin film transistors (TFTs) or metal oxide semiconductor (MOS) field effect transistors, which will not be limited here. Moreover, the source electrode and the drain electrode of the transistors may be exchanged without any difference.

In the following, the operation principle of the touch driver circuit provided by the embodiment of the invention will be described with reference to several examples. In the following examples, voltage Vss at the first reference signal terminal Ref1 is of a low level, voltage $V_{DD}$ at the second reference signal terminal Ref2 is of a high level. When the driving transistor T0 is an N-type transistor, the signal at the reset signal terminal VG is of a low level. When the driving transistor T0 is a P-type transistor, the signal at the reset signal terminal VG is of a high level.

EXAMPLE 1

Figure 3A:
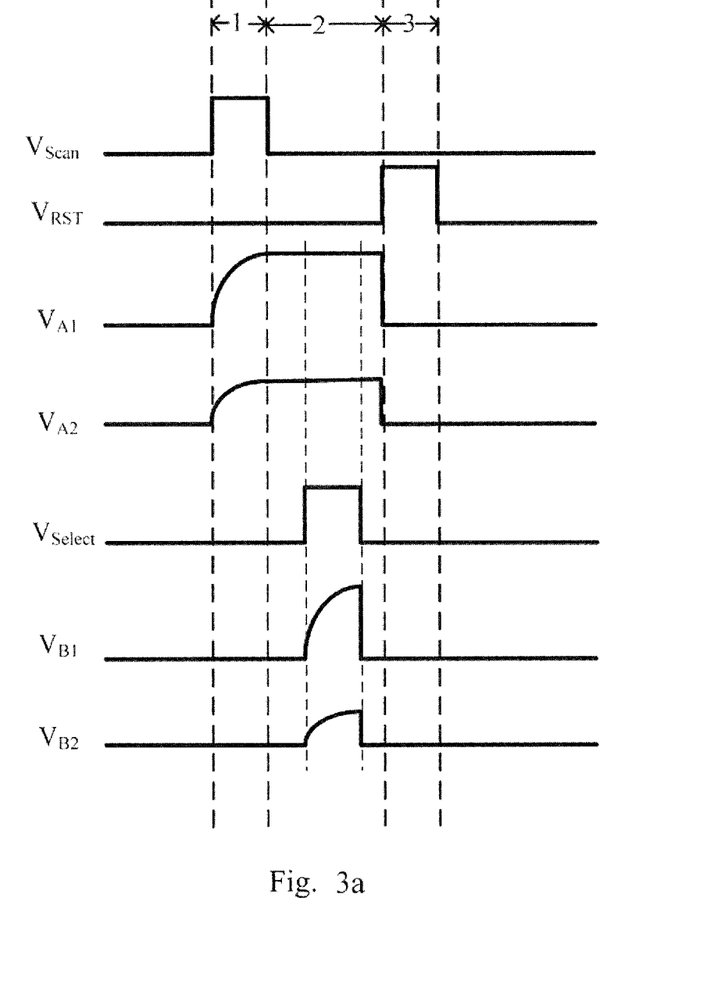
FIGS. 3a to 3d are timing diagrams of a touch driver circuit in accordance with an embodiment of the invention.

As illustrated in FIG. 2a, the driving transistor T0, the first, second and third switch transistors T1, T2 and T3 are all N type transistors. FIG. 3a is the timing diagram of FIG. 2a, in which the voltage at the scan signal terminal is VScan, the voltage at the reset control signal terminal is VRST, the voltage at the control signal terminal is VSelect, the drain voltage of the driving transistor T0 is VA1 in case of being touched and VA2 in case of being not touched, and the voltage at the touch signal sensing terminal (sensor) is VB1 in case of being touched and VB2 in case of being not touched.

The operation principle of the touch driver circuit is as follows.

In first phase 1, the voltage VScan at the scan signal terminal is of a high level, the voltage VRST at the reset control signal terminal and the voltage VSelect at the control signal terminal are both of a low level, the first switch transistor T1 is turned on, and the second and third switch transistors T2 and T3 are turned off. In this phase, the voltage VScan at the scan signal terminal is transmitted to the second terminal y of the capacitor Cst via the turned-on first switch transistor T1; meanwhile, the voltage VDD at the second reference signal terminal is transmitted to the first terminal x of the capacitor. Under the action of the capacitor Cst, the gate voltage of the driving transistor T0 will be raised gradually and the driving transistor T0 will be gradually turned on. The voltage VDD at the second reference signal terminal is transmitted to the source electrode of the second switch transistor T2 via the turned on driving transistor T0. As the second switch transistor T2 is in the OFF state, no touch sensing signal is output at the touch signal sensing terminal sensor.

In this phase, when the PD is not irradiated, that is, when a touch operation occurs, the gate voltage of the driving transistor T0 is held at a high level after being gradually raised under the action of the capacitor Cst, the driving transistor T0 is gradually turned on, and the drain voltage $V_{A1}$ of the driving transistor T0 is held at a high level after being gradually raised.

In this phase, when the PD is irradiated, that is, when no touch operation occurs, a large backward current is formed under the photoelectric effect of the PD, pulling down the voltage input to the gate electrode of the driving transistor T0. As a result, the gate voltage of the driving transistor T0 is increased more slowly than when the PD is not irradiated, and the level held for the gate voltage of the driving transistor T0 after being gradually raised is lower than when the PD is not irradiated. When the gate voltage of the driving transistor T0 is gradually raised, the driving transistor T0 is gradually turned on, the drain voltage $V_{A2}$ of the driving transistor T0 is also gradually increased, and held at the level that is lower than the drain voltage $V_{A1}$ of the driving transistor T0 when the PD is not irradiated. The stronger the light irradiated on the PD is, the lower the gate voltage of the driving transistor T0 is, and the lower the drain voltage $V_{A2}$ of the driving transistor T0 is.

In second phase 2, both the voltage VScan at the scan signal terminal and the voltage VRST at the reset control signal terminal are of a low level, and the first and third switch transistors T1 and T3 are turned off. In this phase, the voltage VSelect at the control signal terminal is of a high level and the second switch transistor T2 is turned on. No matter the PD is irradiated or not, the turned-on second switch transistor T2 will output the drain voltage of the driving transistor T0 to the touch signal sensing terminal sensor, that is, a touch sensing signal is output at the touch signal sensing terminal sensor. However, the touch sensing signal output at the touch signal sensing terminal sensor when the PD is in a touch state is larger than when the PD is not in a touch state.

In third phase 3, both the voltage VScan at the scan signal terminal and the voltage VSelect at the control signal terminal are of a low level, the voltage VRST at the reset control signal terminal is of a high level, the first and second switch transistors T1 and T2 are turned off, and the third switch transistor T3 is turned on. In this phase, as the signal at the reset signal terminal VG is of a low level, the voltage at the second terminal y of the capacitor Cst is input to the reset signal terminal VG via the turned-on third transistor T3, driving the gate voltage of the driving transistor T0 to lower and turning off the driving transistor T0, thereby returning to the state prior to the first phase. Moreover, no touch sensing signal is output at the touch signal sensing terminal sensor as the second switch transistor T2 is turned off.

From the above, in the above-described touch driver circuit, the touch sensing signal output at the touch signal sensing terminal sensor in case of being touched is larger than that in case of being not touched. As a result, it can be determined whether the touch panel is touched by analyzing the amplitude of the touch sensing signal output by the touch driver circuit, and in turn the position of the touch point can be determined, thereby realizing the touch driving function.

EXAMPLE 2

Figure 3B:
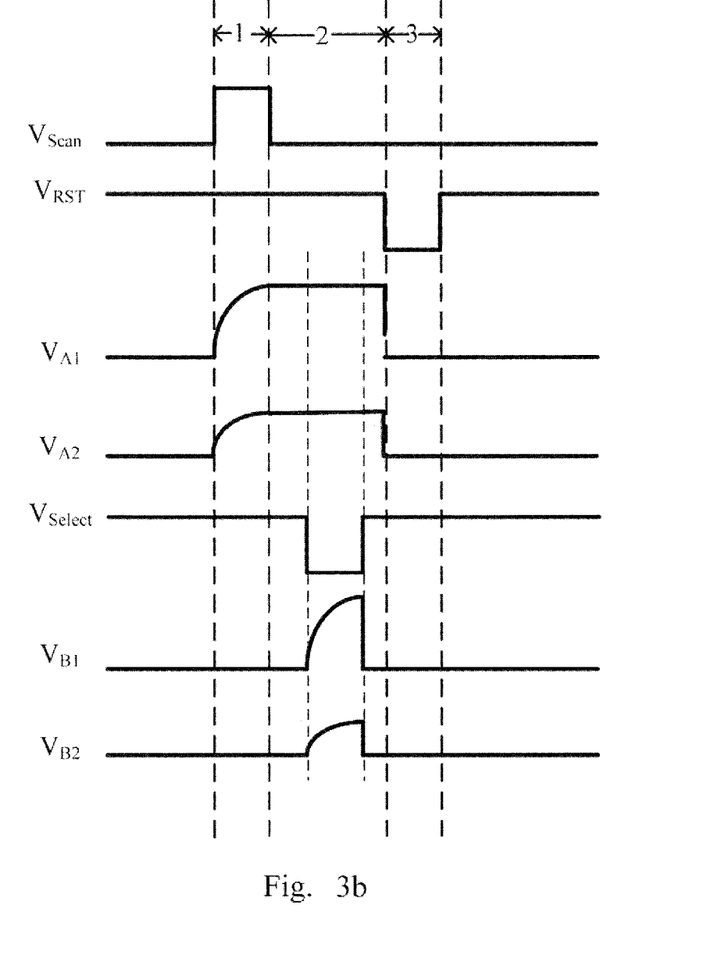

As illustrated in FIG. 2b, the driving transistor T0 and the first switch transistors are N-type transistors, and the second and third switch transistors T2 and T3 are P type transistors. FIG. 3b is the timing diagram of FIG. 2b, in which the voltage at the scan signal terminal is VScan, the voltage at the reset control signal terminal is VRST, the voltage at the control signal terminal is VSelect, the drain voltage of the driving transistor T0 is VA1 in case of being touched and VA2 in case of being not touched, and the voltage at the touch signal sensing terminal (sensor) is VB1 in case of being touched and VB2 in case of being not touched.

The operation principle of the touch driver circuit is as follows.

In the first phase 1, the voltage VScan at the scan signal terminal, the voltage VRST at the reset control signal terminal and the voltage VSelect at the control signal terminal are all of a high level, the first switch transistor T1 is turned on, and the second and third switch transistors T2 and T3 are turned off. In this phase, the voltage VScan at the scan signal terminal is transmitted to the second terminal y of the capacitor Cst via the turned-on first switch transistor T1; meanwhile, the voltage VDD at the second reference signal terminal is transmitted to the first terminal x of the capacitor. Under the action of the capacitor Cst, the gate voltage of the driving transistor T0 will be raised gradually and the driving transistor T0 will be gradually turned on. The voltage VDD at the second reference signal terminal is transmitted to the source electrode of the second switch transistor T2 via the turned on driving transistor T0. As the second switch transistor T2 is in the OFF state, no touch sensing signal is output at the touch signal sensing terminal sensor.

In this phase, when the PD is not irradiated, that is, when a touch operation occurs, the gate voltage of the driving transistor T0 is held at a high level after being gradually raised under the action of the capacitor Cst, the driving transistor T0 is gradually turned on, the drain voltage $V_{A1}$ of the driving transistor T0 is held at a high level after being gradually raised.

In this phase, when the PD is irradiated, that is, when no touch operation occurs, a large backward current is formed under the photoelectric effect of the PD, pulling down the voltage input to the gate electrode of the driving transistor T0. As a result, the gate voltage of the driving transistor T0 is increased more slowly than when the PD is not irradiated, and the level held for the gate voltage of the driving transistor T0 after being gradually raised is lower than when the PD is not irradiated. When the gate voltage of the driving transistor T0 is gradually increased, the driving transistor T0 is gradually turned on, the drain voltage $V_{A2}$ of the driving transistor T0 is also gradually increased, and held at the level that is lower than the drain voltage $V_{A1}$ of the driving transistor T0 when the PD is not irradiated. The stronger the light irradiated on the PD is, the lower the gate voltage of the driving transistor T0 is, and the lower the drain voltage $V_{A2}$ of the driving transistor T0 is.

In second phase 2, the voltage VScan at the scan signal terminal is of a low level and the voltage VRST at the reset control signal terminal is of a low level, and the first and third switch transistors T1 and T3 are turned off. In this phase, the voltage VSelect at the control signal terminal is of a low level and the second switch transistor T2 is turned on. No matter the PD is irradiated or not, the turned-on second switch transistor T2 will output the drain voltage of the driving transistor T0 to the touch signal sensing terminal sensor, that is, a touch sensing signal is output at the touch signal sensing terminal sensor. However, the touch sensing signal output at the touch signal sensing terminal sensor when the PD is in a touch state is larger than when the PD is not in a touch state.

In third phase 3, both the voltage VScan at the scan signal terminal and the voltage VRST at the rest control signal terminal are of a low level, the voltage VSelect at the control signal terminal is of a high level, the first and second switch transistors T1 and T2 are turned off, and the third switch transistor T3 is turned on. In this phase, as the signal at the reset signal terminal VG is of a low level, the voltage at the second terminal y of the capacitor Cst is input to the reset signal terminal VG via the turned-on third transistor T3, driving the gate voltage of the driving transistor T0 to lower and turning off the driving transistor T0, thereby returning to the state prior to the first phase. Moreover, no touch sensing signal is output at the touch signal sensing terminal sensor as the second switch transistor T2 is turned off.

From the above, in the above-described touch driver circuit, the touch sensing signal output at the touch signal sensing terminal sensor when a touch operation occurs is larger than that when no touch operation occurs. As a result, it can be determined whether the touch panel is touched by analyzing the amplitude of the touch sensing signal output by the touch driver circuit, in turn the position of the touch point can be determined, thereby realizing the touch driving function.

EXAMPLE 3

Figure 3C:
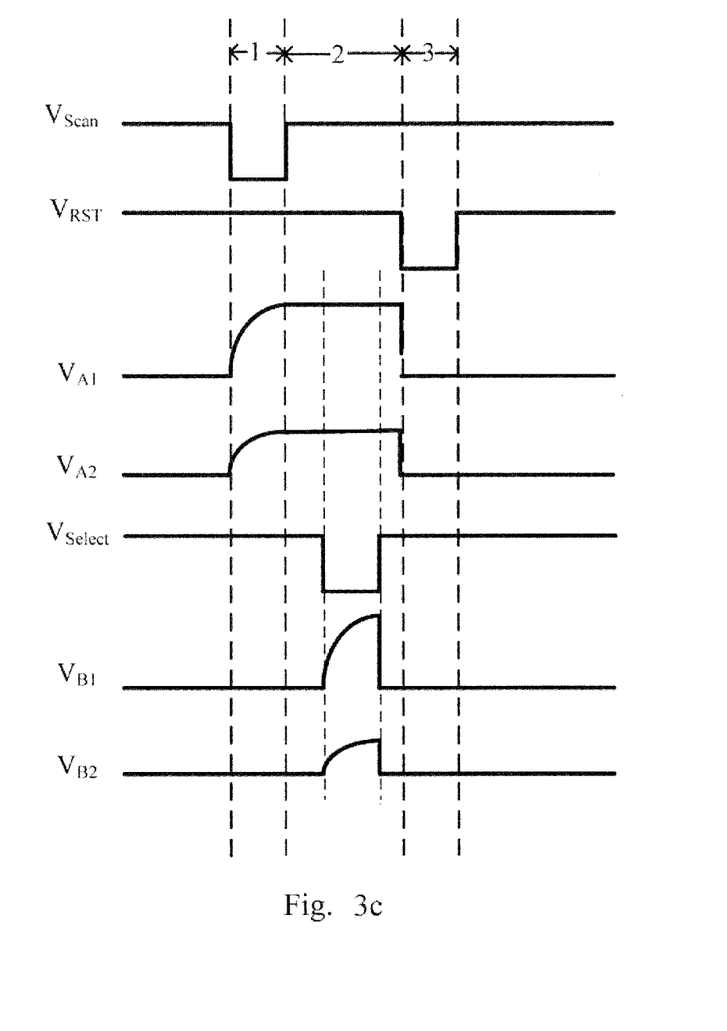

As illustrated in FIG. 2c, the driving transistor T0, the first, second and third switch transistors T1, T2 and T3 are all P type transistors. FIG. 3c is the timing diagram of FIG. 2c, in which the voltage at the scan signal terminal is VScan, the voltage at the reset control signal terminal is VRST, the voltage at the control signal terminal is VSelect, the drain voltage of the driving transistor T0 is VA1 when a touch operation occurs and VA2 when no touch operation occurs, the voltage at the touch signal sensing terminal (sensor) is VB1 when a touch operation occurs and VB2 when no touch operation occurs.

The operation principle of the touch driver circuit is as follows.

In first phase 1, the voltage VScan at the scan signal terminal is of a low level, the voltage VRST at the reset control signal terminal and the voltage VSelect at the control signal terminal are both of a high level, the first switch transistor T1 is turned on, and the second and third switch transistors T2 and T3 are turned off. In this phase, the voltage VScan at the scan signal terminal is transmitted to the second terminal y of the capacitor Cst via the turned-on first switch transistor T1; meanwhile, the voltage VDD at the second reference signal terminal is transmitted to the first terminal x of the capacitor. Under the action of the capacitor Cst, the gate voltage of the driving transistor T0 is decreased gradually and the driving transistor T0 will be gradually turned on. The voltage VDD at the second reference signal terminal is transmitted to the source electrode of the second switch transistor T2 via the turned on driving transistor T0. As the second switch transistor T2 is in the OFF state, no touch sensing signal is output at the touch signal sensing terminal sensor.

In this phase, when the PD is not irradiated, that is, when a touch operation occurs, the gate voltage of the driving transistor T0 is held at a high level after being gradually raised under the action of the capacitor Cst, the driving transistor T0 is gradually turned on, the drain voltage $V_{A1}$ of the driving transistor T0 is held at a high level after being gradually raised.

In this phase, when the PD is irradiated, that is, when no touch operation occurs, a large backward current is formed under the photoelectric effect of the PD, pulling up the voltage input to the gate electrode of the driving transistor T0. As a result, the gate voltage of the driving transistor T0 is decreased more slowly than when the PD is not irradiated, and the level held for the gate voltage of the driving transistor T0 after being gradually decreased is higher than when the PD is not irradiated. When the gate voltage of the driving transistor T0 is gradually decreased, the driving transistor T0 is gradually turned on, the drain voltage $V_{A2}$ of the driving transistor T0 is also gradually increased, and held at the level that is lower than the drain voltage $V_{A1}$ of the driving transistor T0 when the PD is not irradiated. The stronger the light irradiated on the PD is, the higher the gate voltage of the driving transistor T0 is, and the lower the drain voltage $V_{A2}$ of the driving transistor T0 is.

In second phase 2, both the voltage VScan at the scan signal terminal and the voltage VRST at the reset control signal terminal are of a high level, and the first and third switch transistors T1 and T3 are turned off. In this phase, the voltage VSelect at the control signal terminal is of a low level and the second switch transistor T2 is turned on. No matter the PD is irradiated or not, the turned-on second switch transistor T2 will output the drain voltage of the driving transistor T0 to the touch signal sensing terminal sensor, that is, a touch sensing signal is output at the touch signal sensing terminal sensor. However, the touch sensing signal output at the touch signal sensing terminal sensor when the PD is in a touch state is larger than when the PD is not in a touch state.

In third phase 3, both the voltage VScan at the scan signal terminal and the voltage VSelect at the control signal terminal are of a high level, the voltage VRST at the reset control signal terminal is of a low level, the first and second switch transistors T1 and T2 are turned off, and the third switch transistor T3 is turned on. In this phase, as the signal at the reset signal terminal VG is of a high level, the high level signal at the reset signal terminal VG is input to the second terminal y of the capacitor Cst via the turned-on third transistor T3, driving the gate voltage of the driving transistor T0 to rise and turning off the driving transistor T0, thereby returning to the state before the first phase. Moreover, no touch sensing signal is output at the touch signal sensing terminal sensor as the second switch transistor T2 is turned off.

Due to the above, the touch sensing signal output at the touch signal sensing terminal sensor of the above touch driver circuit when a touch operation occurs is larger than that when no touch operation occurs. As a result, it can be determined whether the touch panel is touched by analyzing the amplitude of the touch sensing signal output by the touch driver circuit, in turn the position of the touch point can be determined, thereby realizing the touch driving function.

EXAMPLE 4

Figure 3D:
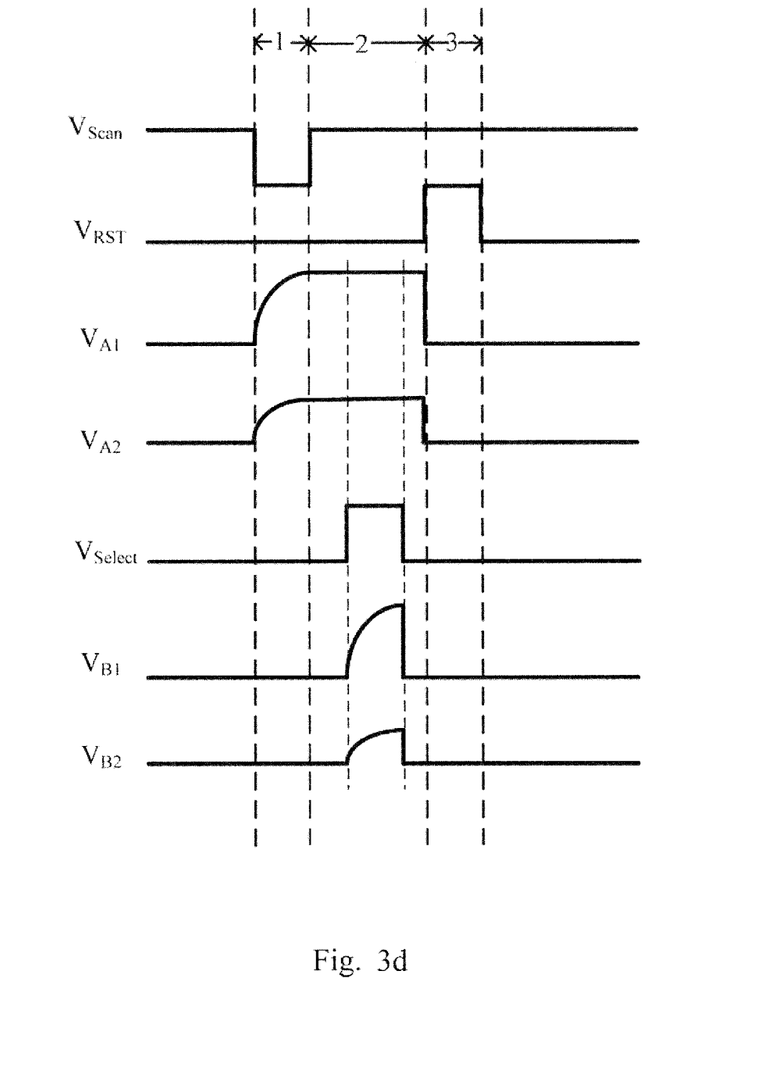

As illustrated in FIG. 2d, the driving transistor T0 and the first switch transistors are P-type transistors, and the second and third switch transistors T2 and T3 are N type transistors. FIG. 3d is the timing diagram of FIG. 2d, in which the voltage at the scan signal terminal is VScan, the voltage at the reset control signal terminal is VRST, the voltage at the control signal terminal is VSelect, the drain voltage of the driving transistor T0 is VA1 when a touch operation occurs and VA2 when no touch operation occurs, the voltage at the touch signal sensing terminal (sensor) is VB1 when a touch operation occurs and VB2 when no touch operation occurs.

The operation principle of the touch driver circuit is as follows.

In first phase 1, the voltage VScan at the scan signal terminal, the voltage VRST at the reset control signal terminal and the voltage VSelect at the control signal terminal are all of a low level, the first switch transistor T1 is turned on, and the second and third switch transistors T2 and T3 are turned off. In this phase, the voltage VScan at the scan signal terminal is transmitted to the second terminal y of the capacitor Cst via the turned-on first switch transistor T1; meanwhile, the voltage VDD at the second reference signal terminal is transmitted to the first terminal x of the capacitor. Under the action of the capacitor Cst, the gate voltage of the driving transistor T0 will be decreased gradually and the driving transistor T0 will be gradually turned on. The voltage VDD at the second reference signal terminal is transmitted to the source electrode of the second switch transistor T2 via the turned on driving transistor T0. As the second switch transistor T2 is in the OFF state, no touch sensing signal is output at the touch signal sensing terminal sensor.

In this phase, when the PD is not irradiated, that is, when a touch operation occurs, the gate voltage of the driving transistor T0 is held at a high level after being gradually decreased under the action of the capacitor Cst, the driving transistor T0 is gradually turned on, and the drain voltage $V_{A1}$ of the driving transistor T0 is held at a high level after being gradually raised.

At this phase, when the PD is irradiated, that is, when no touch operation occurs, a large backward current is formed under the photoelectric effect of the PD, pulling up the voltage input to the gate electrode of the driving transistor T0. As a result, the gate voltage of the driving transistor T0 is decreased more slowly than when the PD is not irradiated, and the level held for the gate voltage of the driving transistor T0 after being gradually decreased is higher than when the PD is not irradiated. When the gate voltage of the driving transistor T0 is gradually decreased, the driving transistor T0 is gradually turned on, the drain voltage $V_{A2}$ of the driving transistor T0 is also gradually increased, and held at the level that is lower than the drain voltage $V_{A1}$ of the driving transistor T0 when the PD is not irradiated. The stronger the light irradiated on the PD is, the higher the gate voltage of the driving transistor T0 is, and the lower the drain voltage $V_{A2}$ of the driving transistor T0 is.

In second phase 2, the voltage VScan at the scan signal terminal is of a high level and the voltage VRST at the reset control signal terminal is of a low level, and the first and third switch transistors T1 and T3 are turned off. In this phase, the voltage VSelect at the control signal terminal is of a high level and the second switch transistor T2 is turned on.

No matter the PD is irradiated or not, the turned-on second switch transistor T2 will output the drain voltage of the driving transistor T0 to the touch signal sensing terminal sensor, that is, a touch sensing signal is output at the touch signal sensing terminal sensor. However, the touch sensing signal output at the touch signal sensing terminal sensor when the PD is in a touch state is larger than when the PD is not in a touch state.

In third phase 3, both the voltage VScan at the scan signal terminal and the voltage VRST at the rest control signal terminal are of a high level, the voltage VSelect at the control signal terminal is of a low level, the first and second switch transistors T1 and T2 are turned off, and the third switch transistor T3 is turned on. In this phase, as the signal at the reset signal terminal VG is of a high level, this high level signal at the reset signal terminal VG is input to the second terminal y of the capacitor Cst via the turned-on third transistor T3, driving the gate voltage of the driving transistor T0 to rise and turning off the driving transistor T0, thereby returning to the state before the first phase. Moreover, no touch sensing signal is output at the touch signal sensing terminal sensor when the second switch transistor T2 is turned off.

From the above, in the above touch driver circuit, the touch sensing signal output at the touch signal sensing terminal sensor when a touch operation occurs is larger than that when no touch operation occurs. As a result, it can be determined whether the touch panel is touched by analyzing the amplitude of the touch sensing signal output by the touch driver circuit, in turn the position of the touch point can be determined, thereby realizing the touch driving function.

Based on the same inventive concept, an embodiment of the invention further provides an in-cell optical touch panel comprising any of the above-described touch driver circuits provided by the embodiment of the invention. As the principle of solving problems of the in-cell optical touch panel is similar to that of the above touch driver circuit, the implementations of the in-cell optical touch panel can refer to those of the touch driver circuit, which will not be elaborated here.

Based on the same inventive concept, an embodiment of the invention further provides a display device comprising the above-described in-cell optical touch panel provided by the embodiment of the invention. The display device may be a mobile phone, a tablet PC, a television, a monitor, a laptop PC, a digital photo-frame, a navigator and any product or component having a display function. The other indispensible components of the display devices are well-know to those skilled in the art and will not be elaborated here and are not limitative to the invention.

The embodiments of the invention provide a touch driver circuit, an in-cell optical touch panel and a display device. The touch driver circuit comprises a photosensor module, a data writing module, a driver module and a control module. The data writing module transmits a scan signal at a scan signal terminal to the driver module under the control of the scan signal terminal. When the scan signal drives the driver module to turn on, the driver module outputs a touch sensing signal to the control module; the touch sensing signal decreases with the increase of an intensity of light irradiated on the photosensor module. Under the control of the control signal, the control module outputs the touch sensing signal output by the driver module to the touch signal sensing terminal, thereby realizing the touch sensing function. In the touch driver circuit provided by the embodiments of the invention, the driver module transmits the touch sensing signal to the touch signal sensing terminal under the control of the control module. If touch signal sensing terminals of individual driver stages are connected to the same touch signal sensing line, the cross-talk between the signals output at the touch signal sensing terminal of the driver circuits of different stages can be avoided, which improves the accuracy of the touch signal detection without increasing the wiring area of the touch panel.

What are described above is related to the illustrative embodiments of the disclosure only and not limitative to the scope of the disclosure; the scopes of the disclosure are defined by the accompanying claims.

The invention claimed is:

1. A touch driver circuit, comprising a photosensor module, a data writing module, a driver module, and a control module,
wherein a first terminal of the photosensor module is connected to a first reference signal terminal, a second terminal of the photosensor module is connected to a signal output terminal of the data writing module and a first signal input terminal of the driver module;
a first signal input terminal of the data writing module is connected to a scan signal terminal, a second signal input terminal of the data writing module is respectively connected to a second reference signal terminal and a second signal input terminal of the driver module, the data writing module is configured to transmit a scan signal to the driver module under control of the scan signal terminal;
a signal output terminal of the driver module is connected to a first signal input terminal of the control module; the driver module is configured to output a touch sensing signal to the control module where the driver module is turned-ON under control of the scan signal, and the touch sensing signal decreases with increase of an intensity of light irradiated on the photosensor module; and
a second signal input terminal of the control module is connected to a control signal terminal, a signal output terminal of the control module is connected to a touch signal sensing terminal; the control module is configured to output the touch sensing signal output by the driver module to the touch signal sensing terminal under control of the control signal terminal, and the data writing module comprises a first switch transistor and a capacitor,
wherein a first terminal of the capacitor is connected to the second reference signal terminal, a second terminal of the capacitor is connected to a source electrode of the first switch transistor; and
a drain electrode and a gate electrode of the first switch transistor are respectively connected to the same scan signal terminal,
wherein the touch driver circuit further comprises a reset module, the reset module comprises a third switch transistor, a gate electrode of the third switch transistor is connected to a reset control signal terminal, a source electrode of the third switch transistor is connected to the first signal input terminal of the driver module, and a drain electrode of the third switch transistor is connected to a reset signal terminal that is different from the second reference signal terminal,
wherein the reset module is configured to reset a voltage of the first signal input terminal of the driver module to an initial state under control of the reset control signal terminal.

2. The touch driver circuit of claim 1, wherein the driver module comprises a driving transistor, and the first signal input terminal of the driver module is a gate electrode of the driving transistor.

3. The touch driver circuit of claim 1, wherein the driver module comprises a driving transistor,
wherein a gate electrode of the driving transistor is connected to the source electrode of the first switch transistor, a source electrode of the driving transistor is connected to the second reference signal terminal, and a drain electrode of the driving transistor is connected to the first signal input terminal of the control module.

4. The touch driver circuit of claim 3, wherein the driving transistor and the first switch transistor are N-type transistors.

5. The touch driver circuit of claim 3, wherein the driving transistor and the first switch transistor are P-type transistors.

6. The touch driver circuit of cairn 3, wherein the control module comprises a second switch transistor,
wherein a gate electrode of the second switch transistor s connected to the control signal terminal, a source electrode of the second switch transistor is connected to the signal output terminal of the driver module, and a drain connected to the touch signal sensing terminal.

7. The touch driver circuit of claim 3,
wherein the reset module is configured to turn-off the driver module under control of the reset control signal terminal.

8. The touch driver circuit of claim 3, wherein the photosensor module comprises a photodiode,
where the driving transistor and the first switch transistor are N-type transistors, a negative electrode of the photodiode is connected to a gate electrode of the driving transistor; where the driving transistor and the first switch transistor are P-type transistors, a positive electrode of the photodiode is connected to the gate electrode of the driving transistor.

9. The touch driver circuit of claim 8, wherein the driving transistor and the first switch transistor are N-type transistors.

10. The touch driver circuit of claim 8, wherein the driving transistor and the first switch transistor are P-type transistors.

11. The touch driver circuit of claim 1, wherein the control module comprises a second switch transistor,
wherein a gate electrode of the second switch transistor is connected to the control signal terminal, a source electrode of the second switch transistor is connected to the signal output terminal of the driver module, and a drain connected to the touch signal sensing terminal.

12. The touch driver circuit of claim 1,
wherein the reset module is configured to turn-off the driver module under control of the reset control signal terminal.

* * * * *